UNITED STATES PATENT OFFICE.

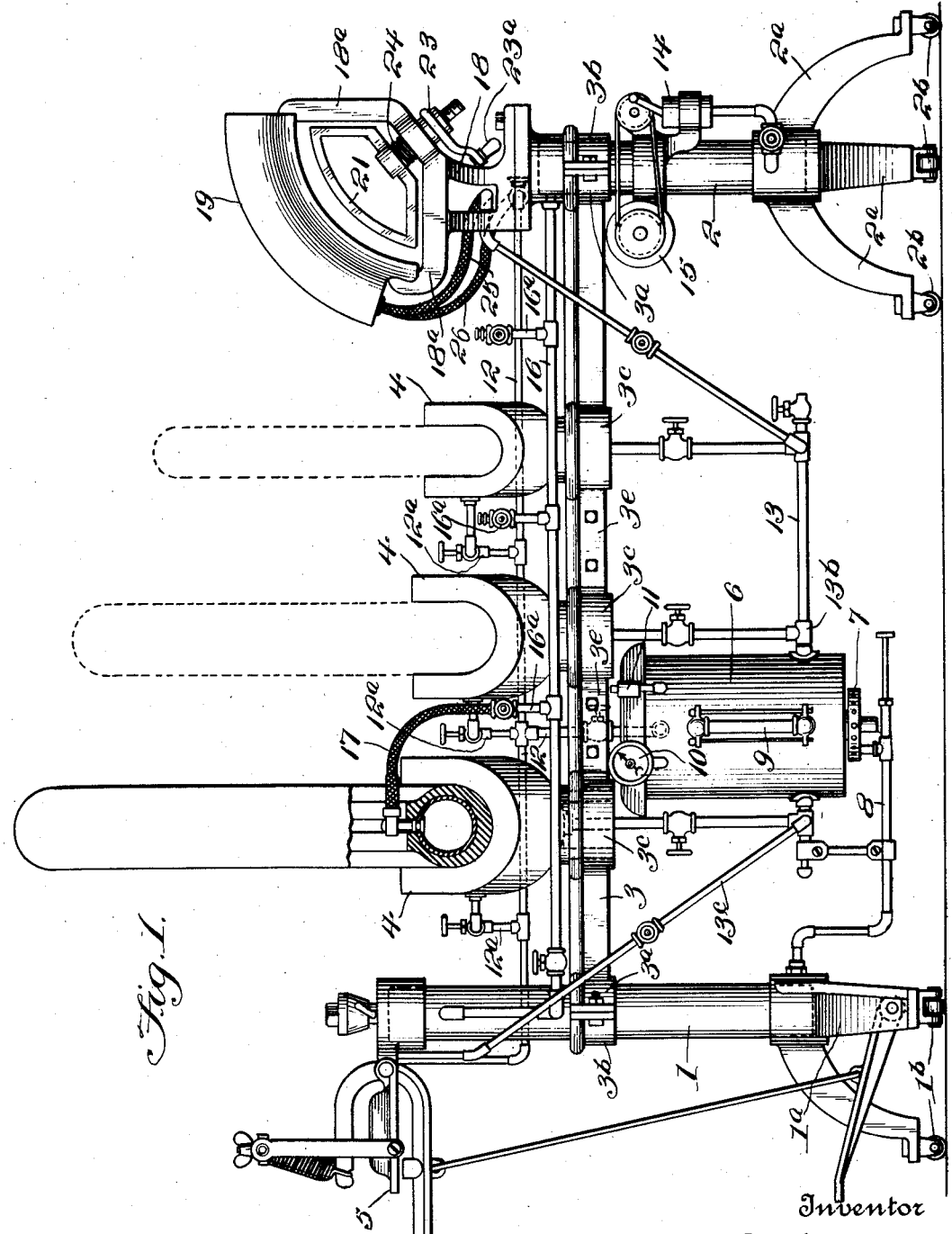

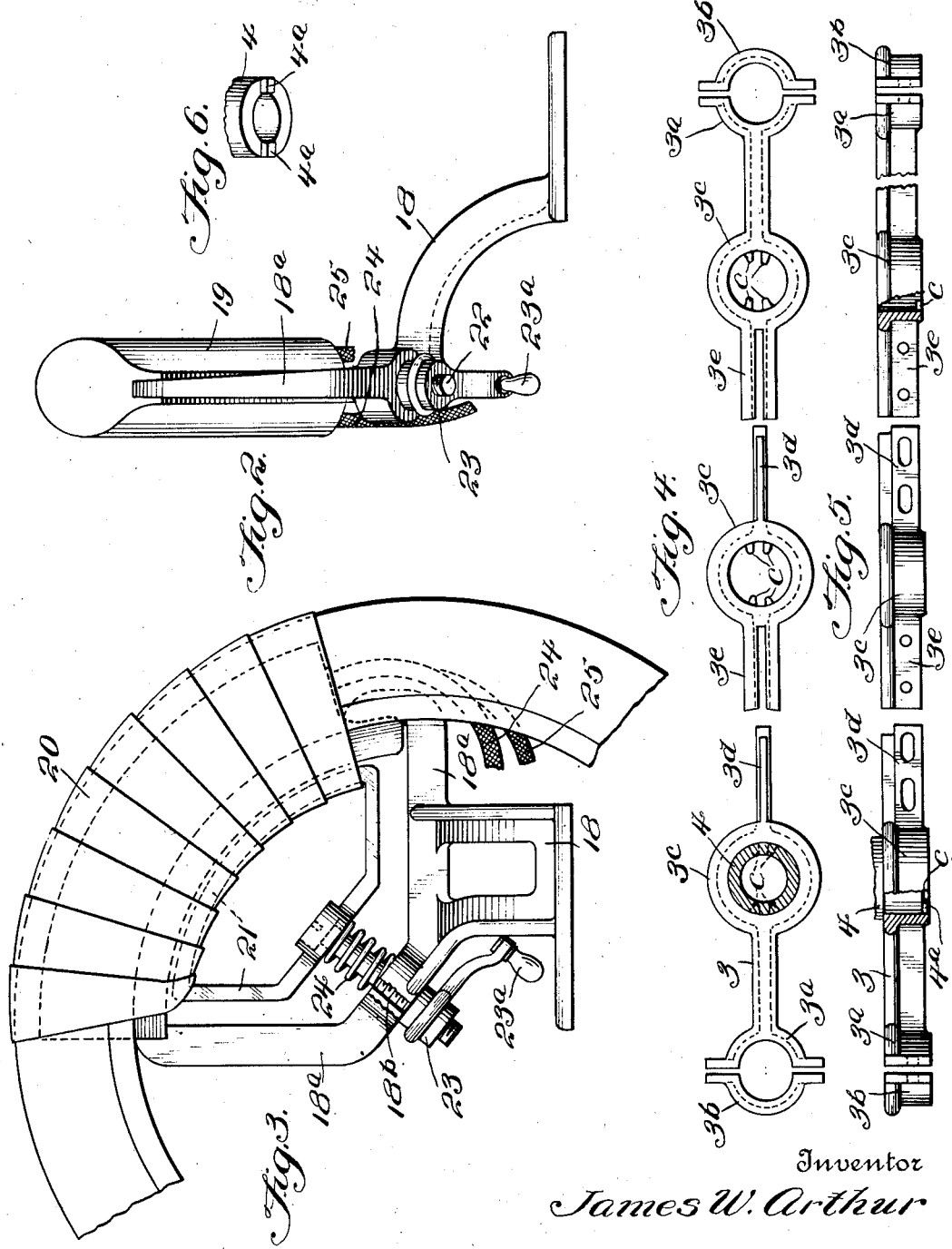

JAMES W. ARTHUR, OF AKRON, OHIO, ASSIGNOR TO THE WILLIAMS FOUNDRY AND MACHINE CO., OF AKRON, OHIO, A CORPORATION OF OHIO.

VULCANIZING APPARATUS.

1,365,365.  Specification of Letters Patent.  Patented Jan. 11, 1921.

Application filed July 3, 1920. Serial No. 393,852.

*To all whom it may concern:*

Be it known that I, JAMES W. ARTHUR, a citizen of the United States, and resident of Akron, Ohio, have invented certain new and useful Improvements in Vulcanizing Apparatus, of which the following is a specification.

My present invention relates to improvements in vulcanizing apparatus for pneumatic tires and aims to provide a simple, economical, efficient and durable self contained structure which will be adapted for making inside and outside repairs on tire shoes or casings and also for repairing the inner tubes of such casings.

Another object is to provide a construction embodying units whereby the apparatus may be extended or contracted to vary the number of repair molds.

With these and other objects in view the invention includes the novel features of construction and arrangement and combination of parts hereinafter described and particularly defined by the appended claims, an embodiment of my invention being illustrated in the accompanying drawings in which—

Figure 1 is a side elevation of my improved apparatus, and—

Figs. 2 and 3 are detail views.

Fig. 4 is a plan view of the mold supporting member.

Fig. 5 is a front elevation of Fig. 4.

Fig. 6 is a perspective view of a detail.

Referring by reference characters to these drawings, the numerals 1 and 2 designate a pair of columns or pedestals which are utilized to support the working parts of the apparatus and which are preferably of hollow cylindrical form for reasons which will hereinafter appear. They are provided with legs $1^a$ and $2^a$ respectively which are mounted upon wheels or casters $1^b$ and $2^b$ so that the apparatus may be readily moved from place to place. Supported from these two columns and rigidly connecting them is a mold supporting or frame member 3, the opposite ends of which are provided with divided socket members $3^a$ and $3^b$ adapted to embrace the columns and be clamped tightly thereon at the proper elevation by bolts as indicated.

The said frame member is provided with one or more seats for the outside repair molds 4, these seats being preferably in the form of ring shaped portions $3^c$ to receive the mold sections, said ring shaped portions preferably having spaced lugs C between which rest corresponding or coacting lugs 4 on the molds.

I prefer to make the frame member 3 extensible so as to enable it to be adapted for supporting a greater or less number of molds, whereby different sized apparatus may be built up from stock parts, or a customer may subsequently enlarge his apparatus as desired. To this end I preferably make the frame or supporting member of a plurality of parts, each carrying one of the ring shaped seats, said parts or units being adapted to be detachably bolted together. A desirable and rigid form of connection is shown in the drawings comprising a single bar member $3^d$ projecting from one ring shaped portion and adapted to rest between a pair of bar members $3^e$ projecting from the adjoining member, the said bar members being rigidly secured together by transversely arranged bolts as shown.

The pedestal 1 is made hollow to serve as a fuel reservoir and it preferably is provided with a tube patching or repair attachment 5 of substantially the character disclosed in Letters Patent of the United States granted to me on the 8th day of July 1919, under No. 1308834.

The boiler for supplying steam is indicated at 6, having a burner 7 to which fuel is supplied from the hollow interior of column 1 by pipe 8.

The boiler may have a gage glass 9, pressure gage 10, and safety valve 11 as is customary.

From the boiler steam passes to pipe 12 which has branches $12^a$ leading to the mold sections to which said pipes are detachably connected by any suitable joints and are provided with stop cocks as shown.

The branch pipes are connected with pipe 12 by T couplings which makes pipe 12 sectional so that it may be lengthened or shortened to correspond to the supporting member 3.

A return steam or drain pipe 13 is provided connecting with the lower part of the boiler, from which pipe 13 branch pipes lead to the mold sections and this pipe may also be varied as to length by means of T couplings such as shown at $13^b$.

The pedestal or column 2 I preferably use as a tank or chamber for the storage of air under pressure which may be forced into the tank by an air pump 14, supported by the column and driven conveniently by an electric motor 15 also supported by the column. An air pipe line 16, also sectional, takes air from this storage chamber and this pipe may communicate with column 1 above the oil level so as to force the fuel to the burner under pressure.

Pipe 16 also has branches 16ª which are designed to be supplied with flexible pipes 17 which serve to inflate the air bags used to expand the tire shoes or casings against the interior faces of the molds.

Pipe 12 connects with the tube vulcanizing plate 5, as also does return pipe 13, the latter by branch pipe 13ᶜ.

Upon column or pedestal 2 I mount a device for vulcanizing a patch upon the inside of a tire shoe or casing (molds 4 being only for outside patches). This comprises a bracket 18 which supports an arc shaped core section 19, by means of arms 18ª connected to the extremities of the connection. A tire shoe or casing (having an inside patch in place) is applied to the core as shown in Fig. 3, and is wrapped with cloth wrappings as indicated at 20. As it is difficult to wrap by hand to secure sufficient tension I provide means for tightening the convolutions which means preferably takes the form of a loop member 21, having a curved portion adapted to fit the inner face of the core section, the wrapping strip being wound around this curved portion of the loop as well as around the tire on the core section. After the wrapping is in place as shown in Fig. 3 the loop is drawn forcibly away from the core by means comprising preferably a threaded shank or rod passing through an opening 18ᵇ in the supporting bracket and provided with a nut or member 23 internally threaded to fit the threads of the shank, said nut having an operating handle 23ª.

For forcing the loop back against the core section when the nut is unscrewed I provide a spring 24.

The core section is hollow and provided with nipples by which its interior may be placed in communication with the air supply pipes 16 and air or condensation return branch 13ᵈ by means of flexible pipes 25 and 26.

Having thus described my invention, what I claim is—

1. A self contained vulcanizing unit comprising a pair of end pedestals having supporting legs at their lower ends and a connecting supporting member, a tube vulcanizer carried directly by one of said pedestals, an inside patch vulcanizer carried directly by the other pedestal, an outside vulcanizing mold or molds carried by said supporting member, and means for heating all said vulcanizers.

2. In combination, a pair of pedestals or columns, having suitable supporting bases, a horizontal frame member connecting said pedestals, mold sections removably supported by said frame member, a steam generator suspended from said frame member and connections for supplying steam to said mold sections.

3. In combination, a pair of pedestals or columns having suitable supporting bases, a frame member having end portions clamped to said columns, said frame member comprising a plurality of interconnected removable units each unit having means for supporting a mold section.

4. In combination, a pair of columns, a frame member clamped to said columns at opposite ends, said frame member having a plurality of ring shaped portions forming mold seats, and molds removably supported by said seats.

5. In combination, a pair of columns, a frame member connecting said columns and comprising end members having divided ring shaped members adapted to clamp around said columns and one or more intermediate members adapted to be removably connected to said end members, all of said members carrying mold seats.

6. In combination, a pair of hollow pedestals forming respectively fuel and air chambers, a connecting frame, vulcanizing units carried by said parts, means for supplying air under pressure to said air chamber, a boiler connected with said vulcanizing units and having a burner supplied from said fuel chamber, an air pipe leading from said air tank to said fuel oil chamber above the fuel level and having branches for coöperating with certain of said vulcanizing units.

7. In combination a pair of hollow pedestals, forming respectively fuel and air chambers, a connecting frame, vulcanizing units supported by said parts, a boiler connected with said vulcanizing units and having a burner supplied from said fuel chamber, and an air pipe leading from said air chamber to the fuel chamber above the oil level thereof.

8. In a vulcanizer a plurality of vulcanizing units, an air storage tank and a fuel storage tank, a boiler connected with said vulcanizing units and having a burner supplied from said fuel chamber and an air pipe leading from said air tank to said fuel tank above the fuel level thereof.

9. In a vulcanizer a plurality of vulcanizing units, an air storage tank and a fuel storage tank, a boiler connected with said vulcanizing units and having a burner supplied from said fuel chamber and an air pipe leading from said air tank to said fuel tank above the fuel level thereof, and having branches for coöperating with the vulcanizing units.

10. In combination a pair of columns, a frame member connecting said columns and having divided ring shaped end portions clamped around said columns, and mold seats carried by said frame member.

11. In combination a pair of columns, a frame member connecting said columns and having divided ring shaped end portions clamped around said columns, and mold seats carried by said frame member, and tube and inside patch vulcanizers carried directly by said pedestals above the level of the frame member.

12. In combination a core section to support a tire shoe, a support for said section, an arc shaped straining member positioned to have the tire windings pass around the same, a rod slidable through said support and connected to said straining member, a spring arranged to press said straining member in one direction, said rod having a threaded portion, a nut engaging said threaded portion, and means for rotating said nut.

13. In combination a core section to support a tire, a support for said section, an arc shaped straining member having converging arms, a single rod connected to said converging arms and longitudinally movable in said support, and means for effecting longitudinal movement of the rod.

14. In combination a core section to support a tire, a support for said section, an arc shaped straining member having converging arms, a single rod connected to said converging arms and longitudinally movable in said support, a helical spring encircling the rod between the straining member and support and tending to press the member toward the core section, said rod having a threaded outer end, and a handle having a nut portion engaging said threaded portion of the rod and bearing against the support.

In testimony whereof, I affix my signature.

JAMES W. ARTHUR.